United States Patent [19]

Podell

[11] 4,395,670
[45] Jul. 26, 1983

[54] HYBRID ELECTRICAL BRAKING METHOD AND SYSTEM FOR TOOL EQUIPMENT HAVING INDUCTION MOTOR DRIVES

[75] Inventor: Allen F. Podell, Palo Alto, Calif.
[73] Assignee: Cuisinarts, Inc., Greenwich, Conn.
[21] Appl. No.: 236,930
[22] Filed: Feb. 23, 1981
[51] Int. Cl.³ .............................................. H02P 3/24
[52] U.S. Cl. ..................................... 318/758; 318/762
[58] Field of Search ............... 318/357, 758, 759, 760, 318/762, 375, 370

[56] References Cited

U.S. PATENT DOCUMENTS

| | | | |
|---|---|---|---|
| 3,341,758 | 9/1967 | Plumpe, Jr. | 318/762 |
| 3,475,669 | 10/1969 | Oltendorf | 318/762 |
| 3,617,837 | 11/1971 | Beck | 318/762 |
| 4,241,302 | 12/1980 | Benjamin | 318/758 |

Primary Examiner—David Smith, Jr.
Attorney, Agent, or Firm—Parmelee, Bollinger & Bramblett

[57] ABSTRACT

A hybrid electrical braking method and system are provided for tool equipment having induction motor drives. This hybrid electrical braking can be used to advantage in various types of induction motor driven tool equipment where it is desirable rapidly to stop rotation of the motor rotor and tool, whenever the motor is turned off, for example in food processors of the type having a working bowl mounted on a base containing the induction motor, with tool drive means in the bowl for removably supporting a rotary food processing tool driven by the induction motor. The new electrical braking rapidly halts coasting of the rotor and tool by utilizing in sequence two different electromagnetic braking processes, producing rapid but gentle braking effect after the motor has been turned off. During a first portion of this sequence, the starting capacitor is switched into series with both the "START" and "RUN" windings, thereby producing rapid initial braking action, lasting for approximately 50 milliseconds, slowing the rotor to approximately one-half of normal running speed. As soon as the motor has been slowed, a half-wave rectified D.C. current injected through the RUN winding, producing a unidirectional magnetic field in the motor, rapidly brakes the rotor to a halt. Thus, the rotor is rapidly, smoothly braked down to a few RPM in a very brief time after the motor is turned off. Also, in accordance with one aspect of this invention, a novel method and system for automatically injecting D.C. braking current into the winding of an induction motor are provided rapidly braking the rotor down to a few RPM when the motor is turned off, this D.C. being automatically stopped after a predetermined brief time.

4 Claims, 2 Drawing Figures

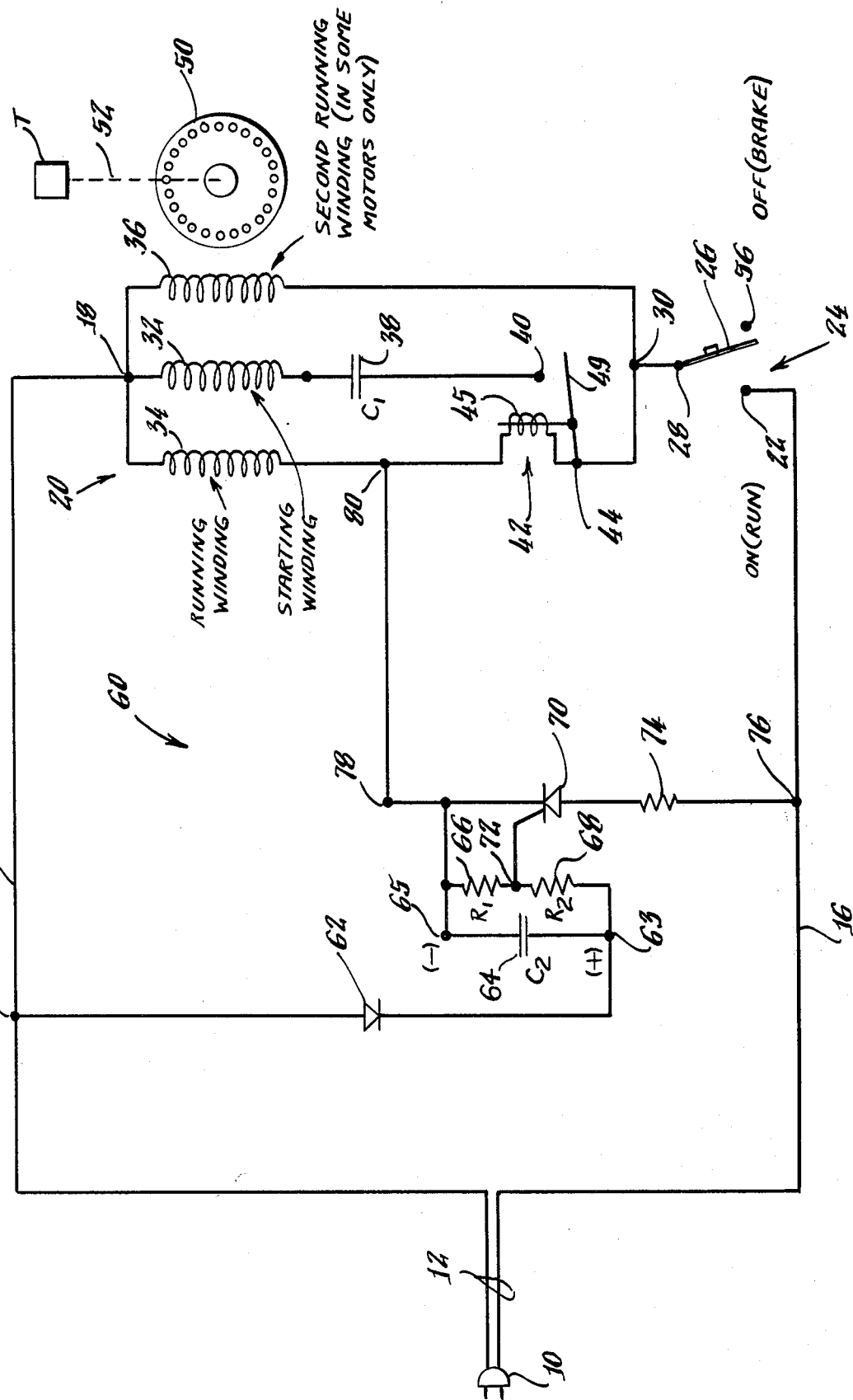

和,670

HYBRID ELECTRICAL BRAKING METHOD & SYSTEM FOR TOOL EQUIPMENT HAVING INDUCTION MOTOR DRIVES

FIELD OF THE INVENTION

The present invention relates to the electrical control of fractional Horsepower capacitor-start induction motors of the type used to drive tool equipment. More particularly, the invention relates to a hybrid electrical braking system which utilizes two different electromagnetic braking processes in sequence for producing a rapid, but gentle, braking effect, rapidly braking rotation of the motor rotor and tool down to a few RPM in less than a second after the motor is turned off. In accordance with one aspect, this invention relates to novel method and apparatus for automatically feeding direct current (D.C.) through a winding of the motor for electromagnetically stopping the rotor with a powerful, rapid braking action, and this D.C. automatically turns off after a predetermined brief period.

BACKGROUND OF THE INVENTION

In tool equipment involving moving parts, it is desirable that the motion quickly stop after the electric power is turned off to avoid possible injury to the user. In those tools driven by fractional Horsepower induction motors, the rotor of the motor is relatively heavy. Moreover, the coasting motor is very quiet as compared to a fractional Horsepower universal-type electric motor having a commutator and brushes, so that the user is not audibly alerted to the continuing coasting motion of the induction motor and its associated driven tool. This quiet coasting can occur in induction-motor-driven food processors.

Such food processors are kitchen appliances utilizing a variety of interchangeable rotary tools, as for example, knives, blades, cutting discs, and rasping discs for performing such operations as cutting, slicing, mixing, blending, grating, shredding, chopping and pureeing, etc.

Known food processors generally include a supporting base structure containing an induction motor, a work bowl adapted to be seated on the base with tool drive means in the work bowl. The specific rotary tool needed for a desired food processing application is removably engaged with the tool drive. When the motor is actuated, such a tool spins rapidly within the work bowl. A cover having a feed tube is removably mounted to the top of the work bowl. Food to be processed is inserted through the feed tube in the cover and into the work bowl to be processed by the rotary tool.

Fractional Horsepower induction motors of the type generally referred to above are used in many such food processors. Such induction motors are energized by single-phase electric power, and so they include a main winding and an auxiliary starter winding. There is a phase-shifting electric component connected in series with the auxiliary winding, such component usually being a capacitor, and the starting winding is energized briefly to start rotation of the rotor. The specific tools used by the appliance are rotated at relatively high speeds during operation to perform their required functions.

In known food processors, the induction-motor-driven rotary tool can revolve at speeds of approximately 1,800 RPM. Thus, it is important that the processor include a braking system which will minimize coasting of the rotary tool after the motor has been de-energized. Such braking systems provide the user with quick access to the processed food in the work bowl after the motor has been turned off and also minimize the possibility of injury to a user if the bowl cover is removed quickly and a hand is immediately inserted into the bowl.

Home appliances such as food processors are often equipped with protective switches which automatically shut off the power when a cover is removed from the zone where the tool is located.

In known braking systems for induction motors, as for example the one illustrated in U.S. Pat. No. 4,241,302—Benjamin, which is assigned to the same assignee as the present application, a starting capacitor of the induction motor is electrically coupled to the windings of the induction motor to produce an electromagnetic braking effect within the motor when a control switch is in the "off" position, the braking effect is produced by converting the rotational mechanical energy into electrical energy which is quickly dissipated as heat.

In practice, it has been found that the braking effect afforded by the starting capacitor of the induction motor is not so great as desired. To enhance the braking effect, this Benjamin patent discloses the use of a second capacitor, separate from the starting capacitor, and having a capacitance from 2 to 10 times larger than that of the starting capacitor, said second capacitor becoming connected to the windings of the induction motor to produce an electromagnetic braking effect after the induction motor has been turned off, using resonance between the capacitors and the windings for optimally converting the rotational mechanical energy into electrical energy which is dissipated as heat for suddenly stopping the motor.

The starting capacitor normally has a capacitance value of a size to cause the current through the starting winding to be approximately 90° out of phase with the current through the running winding(s) for producing a strong starting torque.

In order to provide a greatly enhanced braking action, this second capacitor is chosen to have a capacitance value considerably larger than the starting capacitor, being chosen to be resonant with the running winding, or with both running windings in parallel if a second running winding is present, at a frequency in the range from approximately 15 Hz to 40 Hz for producing quick-acting powerful braking action.

SUMMARY

It is among the advantages of the present invention that it provides an induction motor braking system which is at least as quick, if not quicker, than the braking action produced by the two capacitor systems disclosed and claimed in said Benjamin patent. However, the present system is more compact and less expensive by advantageously employing a half-wave rectified D.C. current which is injected through the RUN winding, producing a unidirectional magnetic field in the motor, which rapidly brakes the rotor toward a halt.

In accordance with one aspect, this invention provides for the rapid stopping of the coasting motion of the motor rotor and tool by utilizing in sequence two different electromagnetic braking processes after the motor has been turned off. During a first portion of this sequence, the starting capacitor in series with both the "START" and "RUN" windings, produces a rapid initial braking action, lasting for approximately 50 milliseconds. This capacitor braking action quickly slows the rotor to approximately one-half of its normal running speed. As soon as the motor has slowed down to approximately one-half of the normal running speed, the D.C. braking effect completes the sequence in rapidly braking the rotor down to a few RPM in less than a second after the motor is turned off.

In accordance with another of its aspects, this invention provides a novel method and system for automatically injecting a D.C. braking current into the winding of an induction motor for rapidly braking the rotor down to a few RPM after the motor is turned off. This D.C. is then automatically turned off after a predetermined brief period.

In case of an induction motor drive in a food processor, a less than two seconds braking time period is desired, because this length of time is too short to allow a person to remove the bowl cover and then inadvertently bring fingers into contact with a rotating tool (resulting from a coasting motor).

In either of its aspects; that is, whether the sequential braking action of the starting capacitor plus D.C. injection is used or whether D.C. injection alone is used, the rotor is slowed down to only a few RPM in a braking time period of considerably less than two seconds.

In the case of other types of tool equipment having induction motor drives, for example such as rotary planers, routers, band saws, lathes, and circular saws, a braking time period of less than two seconds may be desired, and such a shorter braking period down to less than one second can be provided by the present invention.

As used herein, the term "braking time period" is intended to mean the time which is required after the induction motor has been turned off for its rotor plus an unloaded tool to slow down from full speed to only a few RPM (for example, to less than 140 RPM).

It is to be understood with regard to the above definition that electromagnetic braking action, as distinguished from friction braking, diminishes as the rotor slows down. Therefore, the rotor may coast briefly at very low RPM after the "braking time period" has passed. However, the kinetic energy of rotation is a function of the square of the angular velocity. Thus, by comparing the square of 140 RPM (namely, 19,600) to the square of normal running RPM of, for example, 1,730 RPM (namely, 2,992,900), it is seen that the rotational energy of the rotor and tool has been reduced to less than 7/10 ths of one percent of its original value during the braking time period as defined.

BRIEF DESCRIPTION OF THE DRAWINGS

Further objects, features, aspects and advantages of this invention will be more fully understood from a consideration of the following detailed description taken in connection with the accompanying drawings in which:

FIG. 2 is another schematic electrical circuit diagram of a second electromagnetic braking system embodying the present invention in equipment having such a motor driven tool.

DETAILED DESCRIPTION

Figure 1:
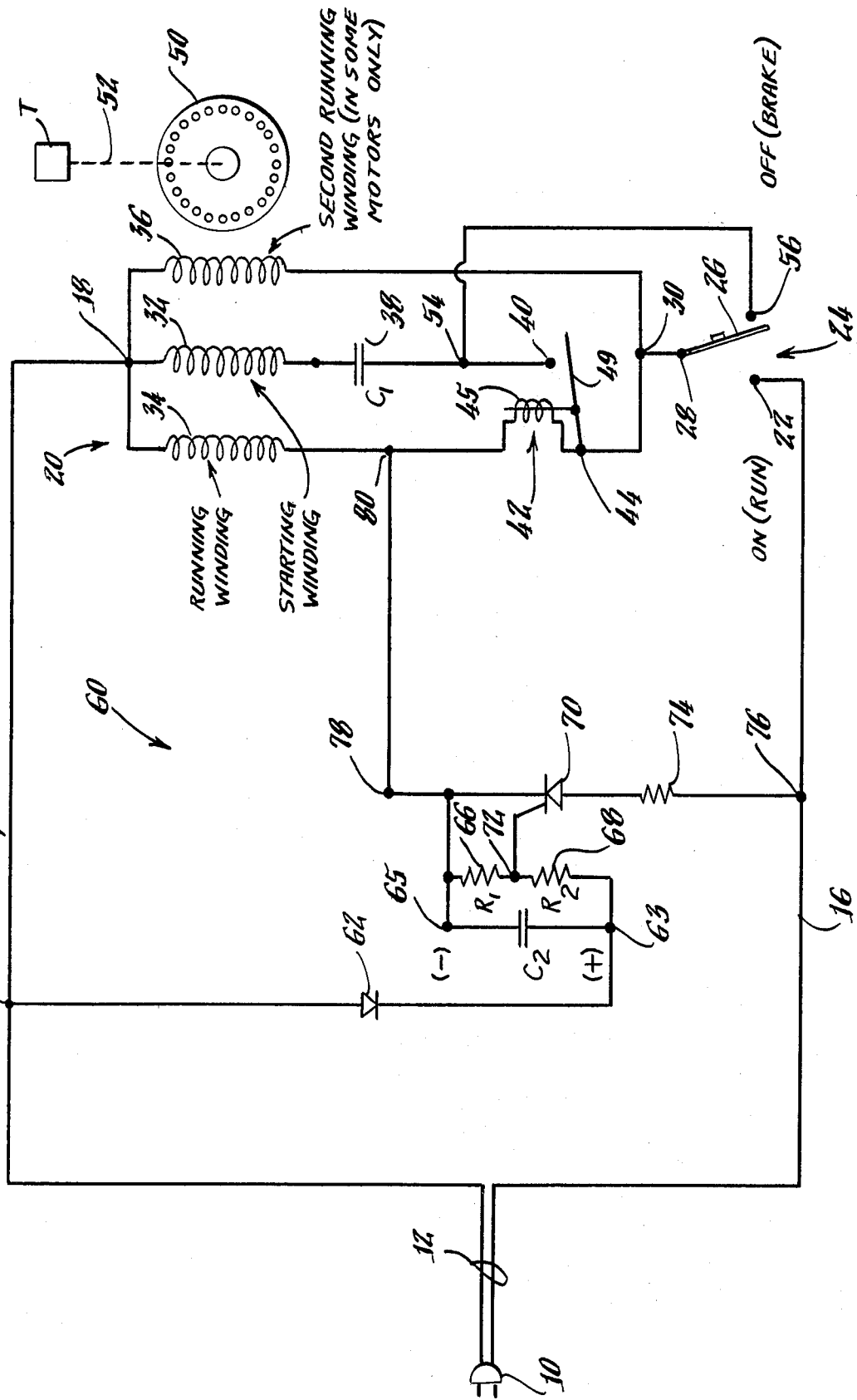
FIG. 1 is a schematic electrical circuit diagram of an electromagnetic braking system embodying the present invention in equipment having an induction motor driven tool.

FIG. 1 of the drawings illustrates a first embodiment of the new electromagnetic braking system for an inducation-motor-driven tool. An electrical plug 10 on a power cord 12 is adapted to be connected to an external electrical source as for example, a typical alternating current (A.C.) outlet socket. The power cord 12 is connected to leads 14 and 16, one of which is connected to the motor terminal 18 which is often called the "common side" of the induction motor 20. The other lead 16 is connected to an "ON" (or "RUN") terminal of an ON-OFF switch 24. This switch has a movable arm 26 with the arm terminal 28 connected to a motor terminal 30 on the opposite side of the motor 20 from the common terminal 18. The electrical side of the motor on which the terminal 30 is located is often called the "relay side".

The induction motor 20 includes a starting winding 32 and a running winding 34. Some fractional-Horsepower induction motors 20 are manufactured with a second running winding 36 connected in parallel with the first running winding 34. The usual reason for having this second running winding 36 is so that the motor 20 is readily adaptable for operation on either 120 volts or 240 volts. For 120 volt operation, the two running windings 34 and 36 are effectively used in parallel as shown in FIGS. 1 and 2. For 240 volt operation they are effectively used in series, as known in the art of induction motors.

A starting capacitor 38 is connected in series with the starting winding 32 and the terminal 40 of the starting relay 42. The other terminal 44 of the relay is connected both to the relay winding 45 and to the motor terminal 30. Thus, the relay winding 45 is always in series with the running winding 34. The impedance of the relay winding 45 is so very low that it produces only a 0.15 volt drop which is practically insignificant.

Abnormally large current flow through the running winding 34 during starting or during the imposition of a heavy load on the motor 20, will cause the relay arm 49 to be pulled into contact with the terminal 40. Induction motors using starting capacitors are well known to those skilled in the art and will not be discussed in detail.

During starting, the momentary large current flow through the relay winding 45 briefly closes the relay arm 49 against the contact 40, thereby placing the starting winding 32 and starting capacitor 38 in circuit with the running winding(s). After the induction motor has started and has accelerated almost up to full running speed, the relay 42 automatically disconnects its arm 49 from the terminal 40, thereby removing the starting winding and capacitor from the circuit.

The rotor 50 of the induction motor 20 turns a tool shaft 52 or other tool drive means on which is mounted a tool T, for example such as a food processor tool or a material working or cutting, planing or routing tool.

In this example, the motor 24 is rated at 110 to 120 volts, 60 Hz and draws approximately 300 Watts when running under load at 1,700 RPM with a power output of approximately 0.2 HP, being well suited for quietly driving a food processor.

In order to provide a capacitative braking action, a lead which extends from the terminal 54 of the starting capacitor is brought out from the relay side of the motor and is connected to the "OFF" (or "BRAKE") terminal 56 of the ON-OF switch. Thus, whenever the switch 24 is turned off, the switch arm 26 engages the contact 56, and the starting capacitor 38 becomes connected in series with the start winding 32 and the running winding(s) 34 (or 34 and 36) to form a resonant loop circuit. The coasting rotor electromagnetically includes an oscillating current in this resonant circuit, thereby dissipating the kinetic energy of rotation as heat resulting from the heating effects of the oscillating current. Rapidly the rotor 50 is slowed down to approximately one-half of its original rotational speed by this capacitor braking action, which constitutes a first stage in the hybrid braking sequence.

Usually the starting capacitor braking action occurs in a relatively brief initial time of approximately 50 milliseconds after the switch 24 is turned off. This starting capacitor 38 has a capacitance value C, in the range from approximately 150 microFarads to 200 microFarads for an induction motor 20 of the size often used in food processors.

In order to inject a direct current briefly into the running winding(s) after the ON-OFF switch 24 is turned off, there is a DC injection braking circuit 60 including a unidirectional current conduction device or rectifier 62 connected to a connection point 61 on the power lead 14. An example of a suitable unidirectional current flow device 62 is a low current flow diode having the ability to withstand a significant inverse peak voltage. In this example the electrical supply plug 10 is intended to be connected to a conventional 120 volt, 60 Hz AC outlet, and consequently the diode 62 should have a peak inverse voltage rating of at least 400 volts.

The unidirectional conduction device 62 serves to charge a capacitor 64 which sets the brief time during which braking D.C. is fed into the running winding(s). In this system, as shown in FIG. 1, the capacitor 64 is normally charged to an rms (root mean square) voltage of approximately 150 volts while the motor 20 is running. The capacitor 64 becomes charged in a polarity with its terminal 65 negative relative to its terminal 63.

A pair of resistors 66 and 68 are connected in series across this capacitor 64. The sum of their resistance values $R_1$ and $R_2$ taken in conjunction with the capacitance $C_2$ of this capacitor 64 is arranged to provide a time constant somewhat longer than the intended "braking time period" of the overall system. Moreover, the resistance $R_1$ is chosen to provide an appropriate gate voltage for an SCR 70. The junction 72 of the resistors 66 and 68 is connected to the gate of the SCR 70. A third resistor 74 is connected from a connection point 76 on the supply lead in series with the SCR for limiting the maximum amount of the D.C. braking current flowing through the running winding(s). For example, this resistor 74 may advantageously have a resistance value in the range from 20 ohms to 60 ohms.

In summary, the D.C. injection braking means 60 has two power input terminals 61 and 76; in other words, it is connected across the AC supply leads 14 and 16 between the two power input connection points 61 and 76. This D.C. injection brake means 60 has an output terminal lead 78 which is connected at 80 to the relay side of the running winding(s).

In operation, the D.C. flow time-setting capacitor 64 becomes charged through the rectifier 62 while the motor is running. While the motor is running, the SCR 70 is shunted by the switch arm 26 and by the relay winding 45 which amounts practically to a short circuit across the SCR, since the impedance of the relay winding is very low as discussed above.

When the ON-OFF switch 24 is turned off, the time-setting capacitor 64 begins discharging, thereby establishing a voltage on the gate of the SCR for causing the SCR to conduct during half-cycles when the supply lead 16 is positive relative to the lead 14. Thus, the SCR passes half-wave D.C. through the running winding(s), creating a unidirectional magnetic field within the motor 20 which rapidly brakes the rotor down to only a few RPM.

As the time-setting capacitor 64 discharges, the voltage at the gate of the SCR changes until the gate voltage becomes too low to keep the SCR turned on. Thus, the D.C. braking current becomes automatically turned off after a brief predetermined time period, for example of approximately 1.5 seconds. The circuit of FIG. 1 has a "braking time period" of less than approximately 1 second.

EXAMPLES AS DESCRIBED

| Component | Value | Rating |
|---|---|---|
| Starting Capacitor 38 | 150 to 200 microFarads | at least 50 volts AC |
| Diode Rectifier 62 | low current flow | 400 peak inverse volts |
| Time-Setting Capacitor 64 | 10 microFarads | 150 volts |
| Resistor 66 | 2,700 ohms | |
| Resistor 68 | 43,000 ohms | |
| Resistor 74 | 20 to 60 ohms | |
| Induction Motor 20 | Fractional Horsepower approx. 0.2 HP at 1,700 RPM | 110 to 120 volts 60 Hz approx. 300 Watts at 1,700 RPM |

The system of FIG. 2 is generally similar to the system of FIG. 1, except that the starting capacitor terminal 54 is only connected to the relay terminal 40, while the OFF (or BRAKE) contact 56 of the switch 24 is an isolated contact. Thus, the braking action is produced entirely by the injection of D.C. from the braking means 60 into the running winding(s). An advantageous braking action is provided, the "braking time period" being less than 2 seconds.

It will be understood that the characteristics of fractional-Horsepower induction motors can vary greatly from manufacturer to manufacturer even among those of the same power rating. Therefore, the particular component values specified above are given as illustrative of a braking system which works to advantage with a particular size of fractional-Horsepower motor, as described.

The description of the embodiments provided herein is intended to be illustrative, and not restrictive of the scope of the invention, that scope being defined only by the following claims and all equivalents thereto.

I claim:

1. The method of electromagnetically rapidly braking rotor rotation in a fractional-Horsepower induction motor having at least one running winding, a starting winding, a starting capacitor, and a starting relay, said braking occurring after the motor has been turned off, said method comprising the steps of:
   immediately after the induction motor has been turned off connecting the starting capacitor in series with at least one of said windings forming a resonant loop circuit for producing an initial rapid braking, immediately after the motor has been turned off feeding unidirectional current through at least one running winding for creating a unidirectional magnetic field in the motor for further braking the rotor, and automatically shutting off said unidirectional current flow after a brief predetermined time period which is sufficiently long for the rotor to stop before the unidirectional current flow is turned off.

2. The method of electromagnetically rapidly braking rotor rotation in a fractional-Horsepower induction motor as claimed in claim 1, including the steps of:

charging a time-setting capacitor whenever the motor is running, placing a resistance across said capacitor for discharging the capacitor at a predetermined rate whenever the motor is turned off, using the voltage developed in said resistance resulting from the flow of capacitor discharge current for controlling the flow of said unidirectional current, and automatically shutting off said unidirectional current when the voltage developed in said resistance has dropped below a predetermined value.

3. A system for electromagnetically rapidly braking rotor rotation in a fractional-Horsepower induction motor having a pair of power supply leads, at least one running winding, a starting winding, a starting capacitor, a starting relay, and a switch for deenergizing the motor when the switch is off, said braking occurring after the switch has been turned off, said system comprising:

a connection from the common side of said motor to a first of said power supply leads, the second of said power supply leads being connected to the "on" terminal of said switch, a connection from the arm terminal of said switch to the relay side of the motor, the "off" terminal of said switch being connected through the starting capacitor and the starting winding in series to said first supply lead for providing a resonant loop including said starting capacitor and at least said starting winding whenever the switch is turned off, a gate-controlled unidirectional conduction device in series with one of said running windings in circuit between said first and second supply leads, said switch arm causing a shunting of said unidirectional conduction device when the switch arm engages the "on" terminal for rendering said device non-conductive whenever the switch is turned on, a time-setting capacitor in series with rectifier means and said switch arm in circuit between said first and second supply lines whenever the switch arm is engaging said "on" terminal for charging said capacitor whenever the switch is turned on, resistance means shunting said time-setting capacitor for discharging said capacitor in a brief predetermined time whenever the switch is turned off, the gate of said unidirectional conduction device being connected to said resistance means for biasing the gate for rendering the device conductive only during said brief predetermined time period whenever the switch is turned off for conducting unidirectional current through said running winding for creating a unidirectional magnetic field in the motor for braking the rotor during said brief time period whenever the motor is turned off, whereby the induction of oscillating current in said resonant loop produces electromagnetic braking of the rotor and also said unidirectional magnetic field produces electromagnetic braking of the rotor for producing rapid rotor braking whenever the motor is turned off.

4. The system as claimed in claim 3 for electromagnetically rapidly braking rotor rotation in a fractional-Horsepower induction motor, in which:

said induction of oscillating current in said resonant loop produces initial powerful braking action for quickly slowing the rotor to approximately half speed, and said unidirectional magnetic field thereafter provides electromagnetic braking for further slowing the rotor, whereby an advantageous hybrid braking action is produced for rapidly braking the rotor.

* * * * *